(No Model.)

J. L. JÖNSSON & T. BERG.
MILK HEATER.

No. 492,300. Patented Feb. 21, 1893.

Witnesses:
Emil Neuhart.
Friedrich, Gustav, Wilhelm.

J. L. Jönsson
Tave Berg Inventors.
By Wilhelm Bonner
Attorneys.

UNITED STATES PATENT OFFICE.

JOHAN LUDVIG JÖNSSON AND TAVE BERG, OF STOCKHOLM, SWEDEN, ASSIGNORS TO THE AKTIEBOLAGET SEPARATOR, OF SAME PLACE.

MILK-HEATER.

SPECIFICATION forming part of Letters Patent No. 492,300, dated February 21, 1893.

Application filed September 21, 1891. Serial No. 406,317. (No model.)

*To all whom it may concern:*

Be it known that we, JOHAN LUDVIG JÖNSSON and TAVE BERG, subjects of the King of Sweden and Norway, residing at Stockholm, Sweden, have jointly invented new and useful Improvements in Milk-Heaters, of which the following is a specification.

This invention relates to milk heaters which consist of a vessel through which the milk flows and which is heated by steam, hot water or air.

The objects of this invention are to provide a uniform distribution of heat over the entire heating surface and to prevent overheating and coagulating of the milk.

Figure 1:
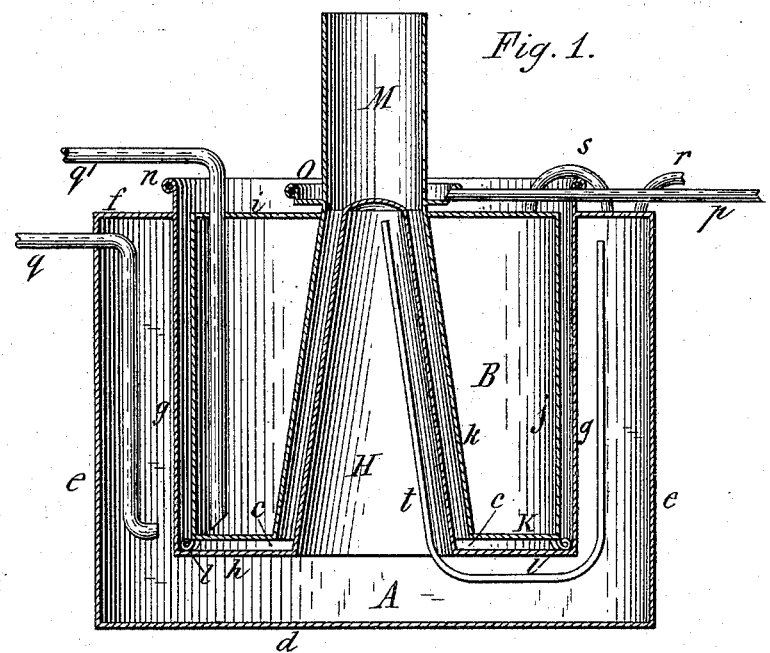
Figure 2:
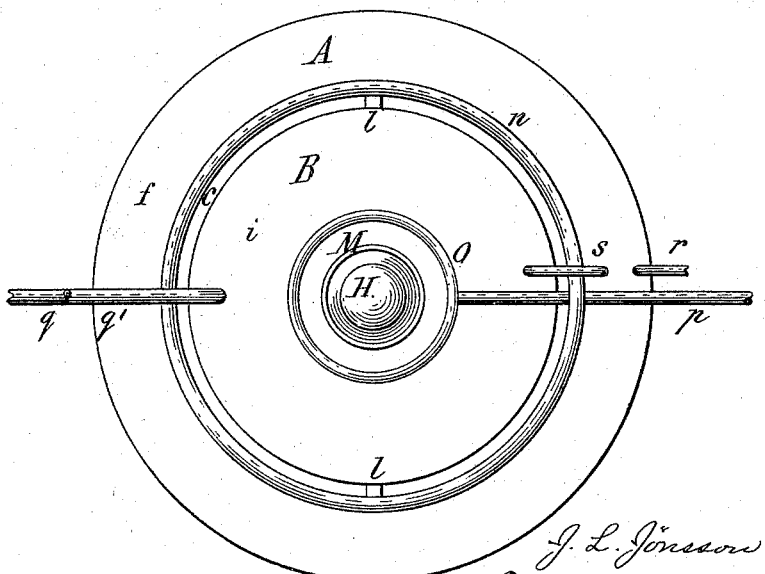

In the accompanying drawings:—Figure 1 is a sectional elevation of our improved milk heater. Fig. 2 is a top plan view thereof.

Like letters of reference refer to like parts in both figures.

A represents the outer heating vessel and B the inner heating vessel, both separated by a narrow passage or space $c$ through which the milk flows. The outer heating vessel A is hollow and is composed of a flat bottom $d$, a cylindrical outer wall $e$, a flat top $f$, an inner cylindrical wall $g$, an inner bottom $h$, which is arranged above the bottom $d$, and a hollow cone H arranged centrally on the inner bottom. The space inclosed by these walls forms a hollow chamber to which the heating medium is supplied. The inner heating vessel B, which is arranged within this outer vessel, is likewise hollow and is composed of a flat top $i$, an outer cylindrical wall $j$, a flat bottom K and a conical inner wall $k$. The outer wall, the bottom and the conical inner wall are arranged parallel with the inner surface of the outer vessel and are separated therefrom by the narrow flow space $c$. The inner vessel is provided with feet $l$ which rest on the inner bottom and against the cylindrical inner wall of the outer vessel and hold the inner vessel at the proper distance from the outer vessel.

M represents the feed pipe which connects with the upper end of the inner conical wall of the inner vessel and which extends upwardly a sufficient height to keep the narrow passage $c$ at all times completely filled with milk and to cause the milk to flow through the same. The inner cylindrical wall $g$ of the outer vessel extends upwardly beyond the top of the inner vessel, forming a projecting flange $n$ which causes the milk to spread over the top of the inner vessel.

O represents an annular tray or cup which surrounds the feed pipe M and is arranged above the top of the inner vessel and below the upper edge of the flange $n$, so that the milk will overflow into this tray before it can reach the upper edge of the flange. This discharge tray is provided with a discharge pipe $p$ through which the milk escapes from the heater.

$q\ q'$ represent pipes which enter the hollow spaces of the outer and inner vessels and through which the steam or other heating medium is supplied to the same.

$r$ is the pipe through which the spent heating medium escapes from the outer vessel.

$s$ is a pipe which connects the top portions of the inner and outer vessels, whereby the action of both vessels is equalized.

$t$ represents a vent pipe which opens in the upper portion of the cone H and extends thence downwardly and underneath the inner bottom of the outer vessel and thence upwardly to a point near the top of the outer vessel. This pipe permits the air which accumulates in the top of the cone to pass off into the outer and upper portion of the outer vessel and to escape with the spent heating medium, whereby the formation of a large air space in the cone is prevented, which might cause an overheating of the top portion of the cone and of the milk passing over the same.

When air is used as the heating medium, both vessels are filled with water before admitting the hot air, to avoid overheating. When steam is used water is not usually required, because a sufficient quantity of water of condensation is soon deposited in the vessels. The milk runs in a very thin layer and under a suitable pressure through the narrow space between the two vessels and becomes quickly heated by contact with the surfaces thereof, without danger of overheating. There is, therefore, no danger of the milk becoming coagulated and attaching itself to the heating surfaces, which is not an unusual occurrence in ordinary milk heaters and which necessitates the employment of brushes or other rubbing or scraping implements to remove the deposit.

We claim as our invention—

1. The combination with an outer hollow heating vessel forming an inclosure adapted to hold a body of heated liquid, of an inner hollow heating vessel forming a similar and separate inclosure and separated from said outer vessel by a narrow flow space which receives the liquid to be heated at one end and discharges it at the other, substantially as set forth.

2. The combination with the outer hollow heating vessel having a raised central portion and a raised marginal portion, of an inner hollow heating vessel arranged in the depression between the raised central and marginal portions of the outer vessel, the inner vessel being separated from the outer vessel by a narrow flow space, substantially as set forth.

3. The combination with the outer hollow heating vessel having a raised marginal portion and a raised central portion on its inner bottom, of an inner hollow heating vessel arranged in the depression between the raised central and marginal portions of the outer vessel and separated from the outer vessel by a narrow flow space and having its inner wall surrounding said cone or projection forming part of the inclosure of said flow space, and an elevated feed pipe connected with said inner wall of said inner vessel, substantially as set forth.

4. The combination with the inner hollow vessel, of the outer hollow vessel provided with a projection which extends above the inner vessel, and a discharge tray and pipe arranged above the inner vessel and below the projection of the outer vessel, substantially as set forth.

5. The combination with the outer and inner hollow heating vessels, separated by a narrow flow space, of supply pipes for the heating medium connected with said vessels, a connecting pipe whereby both vessels are placed in communication, a discharge pipe connected with one of said vessels and through which the spent heating medium escapes, and a feed pipe which opens into the flow space between said vessels, substantially as set forth.

Witness our hands this 3d day of September, 1891.

JOHAN LUDVIG JÖNSSON.
TAVE BERG.

Witnesses:
E. F. CAASE,
STEN ERICSSON.